United States Patent
Kobayashi et al.

(10) Patent No.: US 12,306,015 B2
(45) Date of Patent: May 20, 2025

(54) NOTIFICATION DEVICE AND METHOD FOR MOVING BODY PASSENGERS

(71) Applicant: TOYOTA JIDOSHA KABUSHIKI KAISHA, Toyota (JP)

(72) Inventors: Hiromitsu Kobayashi, Nisshin (JP); Takashi Tokuyama, Kasugai (JP); Sokfan Yee, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 238 days.

(21) Appl. No.: 17/972,162

(22) Filed: Oct. 24, 2022

(65) Prior Publication Data

US 2023/0138577 A1    May 4, 2023

(30) Foreign Application Priority Data

Nov. 4, 2021  (JP) ................................ 2021-180082

(51) Int. Cl.
| | |
|---|---|
| G01C 21/00 | (2006.01) |
| G01C 21/36 | (2006.01) |
| H04W 4/40 | (2018.01) |
| H04W 4/42 | (2018.01) |

(52) U.S. Cl.
CPC ..... *G01C 21/3889* (2020.08); *G01C 21/3605* (2013.01); *H04W 4/40* (2018.02); *H04W 4/42* (2018.02)

(58) Field of Classification Search
None
See application file for complete search history.

(56) References Cited

U.S. PATENT DOCUMENTS

| | | |
|---|---|---|
| 10,106,080 B1 | 10/2018 | Hassani et al. |
| 10,866,106 B2 | 12/2020 | Arakawa |
| 10,991,176 B2 | 4/2021 | Yoshizaki et al. |
| 10,991,254 B2 | 4/2021 | Hayashi et al. |

(Continued)

FOREIGN PATENT DOCUMENTS

| | | |
|---|---|---|
| CN | 109720281 A | 5/2019 |
| JP | 2012-88871 A | 5/2012 |

(Continued)

*Primary Examiner* — Christian Chace
*Assistant Examiner* — Shayne M. Gilbertson
(74) *Attorney, Agent, or Firm* — Sughrue Mion, PLLC (57) ABSTRACT

A device for notification to a moving body passenger includes an information processing device, a moving-body-mounted output device configured to output the notification content, and a communication device configured to transmit the notification content to a device carried by the passenger. The information processing device includes a storage device in which travel information, passenger information and information about a notification content list, and a processor. In the output control process, the processor identifies a control target content indicating the notification content to be targeted by the output control, based on the travel information and the information about the notification content list or based on the travel information, the passenger information and the information about the notification content list, and outputs the control target content to the moving-body-mounted output device if it is determined that a degree of importance of the control target content is at or above a predetermined level.

9 Claims, 8 Drawing Sheets

(56) References Cited

U.S. PATENT DOCUMENTS

| | | |
|---|---|---|
| 11,048,263 B2 | 6/2021 | Urano |
| 11,052,780 B2 | 7/2021 | Taguchi et al. |
| 11,281,215 B2 | 3/2022 | Yoshizaki et al. |
| 2017/0113686 A1* | 4/2017 | Horita ................... B60W 10/20 |
| 2018/0109926 A1* | 4/2018 | Liu ......................... H04W 4/40 |
| 2019/0126937 A1* | 5/2019 | Moon ................ G01C 21/3626 |
| 2019/0128694 A1 | 5/2019 | Matsushita et al. |
| 2019/0129438 A1 | 5/2019 | Morita et al. |
| 2020/0189610 A1 | 6/2020 | Sakai et al. |
| 2020/0324788 A1 | 10/2020 | Ando |
| 2021/0114600 A1* | 4/2021 | Uno ....................... G06V 20/52 |
| 2023/0343215 A1* | 10/2023 | Tanaka ................... G08G 1/123 |

FOREIGN PATENT DOCUMENTS

| | | | |
|---|---|---|---|
| JP | 2016-62414 A | 4/2016 |
| JP | 2018-105745 A | 7/2018 |
| JP | 2020-64369 A | 4/2020 |

\* cited by examiner

CASE OF OUTPUTTING CONTROL TARGET CONTENT TO
MOVING-BODY-MOUNTED OUTPUT DEVICE

CASE OF OUTPUTTING CONTROL TARGET CONTENT TO COMMUNICATION DEVICE

CASE OF NOT OUTPUTTING CONTROL TARGET CONTENT TO COMMUNICATION DEVICE

NOTIFICATION DEVICE AND METHOD FOR MOVING BODY PASSENGERS

CROSS-REFERENCE TO RELATED APPLICATION

The present application claims priority under 35 U.S.C. § 119 to Japanese Patent Application No. 2021-180082, filed Nov. 4, 2021, the contents of which application are incorporated herein by reference in their entirety.

BACKGROUND

Technical Field

The present disclosure relates to a technique for notifying passengers on a moving body.

Background Art

Patent Literature 1 discloses a technology for, in an information processing device mounted on a vehicle, outputting output information to a mobile terminal of an identified passenger. In this technology, a mobile terminal to be an output destination of output information is identified from among a plurality of mobile terminals that are in a state of connection with the information processing device.

LIST OF RELATED ART

Patent Literature 1: JP 2018-105745 A

SUMMARY

When a plurality of passengers are on board a moving body that performs automated driving, it is assumed that, according to a travel state of the moving body, mobile terminals or the like of identified passengers are notified of notification content about safety and transportation of the passengers. However, when the mobile terminals of the passengers are notified of all notification contents, some passengers may feel annoyed. Further, it may not be possible to get the passengers' attention to content with an especially high degree of importance among notification contents about safety. Therefore, improvement for appropriately outputting notification content according to a situation is desirable.

One of objects of the present disclosure is to provide a technology capable of controlling output of notification content to an output destination device according to a degree of importance of the notification content and information about passengers.

A first point of view relates to a device for notification to a moving body passenger, the device being mounted on a moving body and notifying a passenger on the moving body.

The device for notification to a moving body passenger includes an information processing device configured to set a notification content to the passenger. The device for notification to a moving body passenger includes a moving-body-mounted output device configured to output the notification content. The device for notification to a moving body passenger includes a communication device configured to transmit the notification content to a device carried by the passenger.

The information processing device includes a storage device in which travel information about the moving body, passenger information about the passenger and information about a notification content list including the notification content set in association with the travel information and the passenger information, and a degree of importance of the notification content are stored. The information processing device includes a processor configured to perform an output control process for controlling output of the notification content to the moving-body-mounted output device and the communication device.

In the output control process, the processor identifies a control target content indicating the notification content to be targeted by the output control, based on the travel information and the information about the notification content list or based on the travel information, the passenger information and the information about the notification content list.

In the output control process, the processor determines whether or not a degree of importance of the control target content is at or above a predetermined level.

In the output control process, the processor outputs the control target content to the moving-body-mounted output device if it is determined that the degree of importance of the control target content is at or above the predetermined level.

In addition to the first point of view, a second point of view further has the following characteristic.

In the output control process, if it is determined that the degree of importance of the control target content is not at or above the predetermined level, the processor outputs the control target content to the moving-body-mounted output device or the communication device or not output the control target content.

In addition to the second point of view, a third point of view further has the following characteristics.

The passenger information includes notification request information about the notification content, which is set by the passenger.

In the output control process, if it is determined that the degree of importance of the control target content is not at or above the predetermined level, the processor determines whether or not an unwanted notification is set for the control target content, based on the notification request information.

In the output control process, the processor outputs the control target content to the communication device if it is determined that the unwanted notification is not set.

Whereas, in the output control process, the processor does not output the control target content if it is determined that the unwanted notification is set.

In addition to the third point of view, a fourth point of view further has the following characteristics.

The notification request information further includes information about an individual level set by the passenger to notify, from a plurality of control target contents, the control target content requested by the passenger.

In the output control process, if it is determined that the unwanted notification is not set, the processor determines whether or not a degree of importance of the control target content is at or above an individual level.

In the output control process, if it is determined that the unwanted notification is not set, the processor outputs the control target content to the communication device if it is determined that the degree of importance of the control target content is at or above the individual level.

In addition to the second point of view, a fifth point of view further has the following characteristics.

The passenger information includes connection state information about a connection state between the device carried by the passenger and the communication device.

In the output control process, if it is determined that the degree of importance of the control target content is not at or above the predetermined level, the processor determines whether or not the connection state of the device is a cutoff state, based on the connection state information.

In the output control process, the processor outputs the control target content to the moving-body-mounted output device if it is determined that the connection state of the device is the cutoff state.

In addition to the first point of view, a sixth point of view further has the following characteristic.

The passenger information further includes sensor-obtained information that is information about a position and a posture of the passenger obtained from a sensor included in the moving body.

A seventh point of view relates to a device for notification to a moving body passenger, the device being mounted on a moving body and notifying a passenger on the moving body.

The device for notification to a moving body passenger includes an information processing device configured to set a notification content to the passenger. The device for notification to a moving body passenger includes a moving-body-mounted output device configured to output the notification content. The device for notification to a moving body passenger includes a communication device configured to transmit the notification content to a device carried by the passenger.

The information processing device includes a storage device in which travel information about the moving body, passenger information about the passenger and information about a notification content list that includes the notification content set in association with the travel information and the passenger information, and a degree of importance of the notification content. The information processing device includes a processor configured to an output control process for controlling output of the notification content to the moving-body-mounted output device and the communication device.

In the output control process, the processor identifies a control target content indicating the notification content to be targeted by the output control, based on the travel information and the information about the notification content list or based on the travel information, the passenger information and the information about the notification content list.

In the output control process, the processor determines whether or not a degree of importance of the control target content is below a predetermined level.

In the output control process, the processor outputs the control target content to the moving-body-mounted output device or the communication device or not output the control target content if it is determined that the degree of importance of the control target content is below the predetermined level.

In addition to the seventh point of view, an eighth point of view further has the following characteristic.

The passenger information includes notification request information about the notification content, which is set by the passenger.

In the output control process, if it is determined that the degree of importance of the control target content is below the predetermined level, the processor determines whether or not an unwanted notification is set for the control target content, based on the notification request information.

In the output control process, the processor outputs the control target content to the communication device if it is determined that the unwanted notification is not set.

Whereas, in the output control process, the processor does not output the control target content if it is determined that the unwanted notification is set.

In addition to the eighth point of view, a ninth point of view further has the following characteristics.

The notification request information further includes information about an individual level set by the passenger to notify, from a plurality of control target contents, the control target content requested by the passenger.

In the output control process, if it is determined that the unwanted notification is not set, the processor determines whether or not a degree of importance of the control target content is at or above an individual level.

In the output control process, if it is determined that the unwanted notification is not set, the processor outputs the control target content to the communication device if it is determined that the degree of importance of the control target content is at or above the individual level.

In addition to the seventh point of view, a tenth point of view further has the following characteristics.

The passenger information includes connection state information about a connection state between the device carried by the passenger and the communication device.

In the output control process, if it is determined that the degree of importance of the control target content is below the predetermined level, the processor determines whether or not the connection state of the device is a cutoff state, based on the connection state information.

In the output control process, the processor outputs the control target content to the moving-body-mounted output device if it is determined that the connection state of the device is the cutoff state.

An eleventh point of view relates to a method for notification to a moving body passenger, the method including the following steps. A first step involves setting a notification content to the passenger. A second step involves outputting a notification content. A third step involves transmitting the notification content to a device carried by the passenger. A fourth step involves obtaining travel information about the moving body, passenger information about the passengers and information about a notification content list including the notification content set in association with the travel information and the passenger information, and a degree of importance of the notification content. A fifth step involves performing an output control process for controlling output of the notification content to the moving-body-mounted output device and the communication device.

The output control process includes the following steps. A first step involves identifying a control target content indicating the notification content to be targeted by the output control, based on the travel information and the information about the notification content list or based on the travel information, the passenger information and the information about the notification content list. A second step involves determining whether or not a degree of importance of the control target content is at or above a predetermined level. A third step involves outputting the control target content to the moving-body-mounted output device if it is determined that the degree of importance of the control target content is at or above the predetermined level.

A twelfth point of view relates to a method for notification to a moving body passenger, the method including the following steps. A first step involves setting notification contents to the passenger. A second step involves outputting a notification content.

A third step involves transmitting the notification content to a device carried by the passenger. A fourth step involves obtaining travel information about the moving body, passenger information about the passengers and information about a notification content list that includes the notification contents set in association with the travel information and the passenger information, and a degree of importance of the notification content. A fifth step involves performing an output control process for controlling output of the notification content to the moving-body-mounted output device and the communication device.

The output control process includes the following steps. A first step involves identifying a control target content indicating the notification content to be targeted by the output control, based on the travel information and the information about the notification content list or based on the travel information, the passenger information and the information about the notification content list. A second step involves determining whether or not a degree of importance of the control target content is below a predetermined level. A third step involves outputting the control target content to the moving-body-mounted output device or the communication device or not outputting the control target content if it is determined that the degree of importance of the control target content is below the predetermined level.

According to the first point of view, when a degree of importance of a control target content indicating the notification content targeted by the output control is at or above a predetermined level, the control target content can be outputted to the moving-body-mounted output device. Thereby, it becomes possible to control output of a notification content to the output destination device according to a degree of importance of the notification content and information about passengers.

According to the second point of view, when a degree of importance of a control target content is not at or above the predetermined level, it is possible to output the control target content to the moving-body-mounted output device or the communication device or not to output the control target content, by using the passenger information. Thereby, it becomes possible to control output of a notification content to the output destination device according to a degree of importance of the notification content and information about passengers.

According to the third point of view, when a degree of importance of a control target content is not at or above the predetermined level, it is possible to output the control target content to the communication device or not to output the control target content, by using the notification request information included in each piece of passenger information. Thereby, it becomes possible to control output of a notification content to the output destination device according to a degree of importance of the notification content and information about passengers.

According to the fourth point of view, even when degrees of importance of control target contents are not at or above the predetermined level, it is further possible to notify, among control target contents that passengers who require notification of control target contents are to be notified of, only control target contents desired by the passengers, by using the individual level information in the notification request information included in the passenger information. Thereby, it becomes possible to control output of a notification content to the output destination device according to a degree of importance of the notification content and information about passengers.

According to the fifth point of view, when a degree of importance of a control target content is not at or above the predetermined level, it is possible to notify only passengers who request notification of the control target content, by using the connection state information included in the passenger information. Thereby, it becomes possible to control output of a notification content to the output destination device according to a degree of importance of the notification content and information about passengers.

According to the sixth point of view, it becomes possible to decide a notification content to be notified, for each passenger, by using the sensor-obtained information included in the passenger information.

According to the seventh point of view, the same effect as the second point of view can be obtained.

According to the eighth point of view, the same effect as the third point of view can be obtained.

According to the ninth point of view, the same effect as the fourth point of view can be obtained.

According to the tenth point of view, the same effect as the fifth point of view can be obtained.

According to the eleventh point of view, the same effect as the first point of view can be obtained.

According to the twelfth point of view, the same effect as the second and seventh points of view can be obtained.

DETAILED DESCRIPTION

A Notification device and method for moving body passengers according to each embodiment of the present disclosure will be described with reference to accompanying drawings.

1. First Embodiment

1-1. Configuration Example

Figure 1:
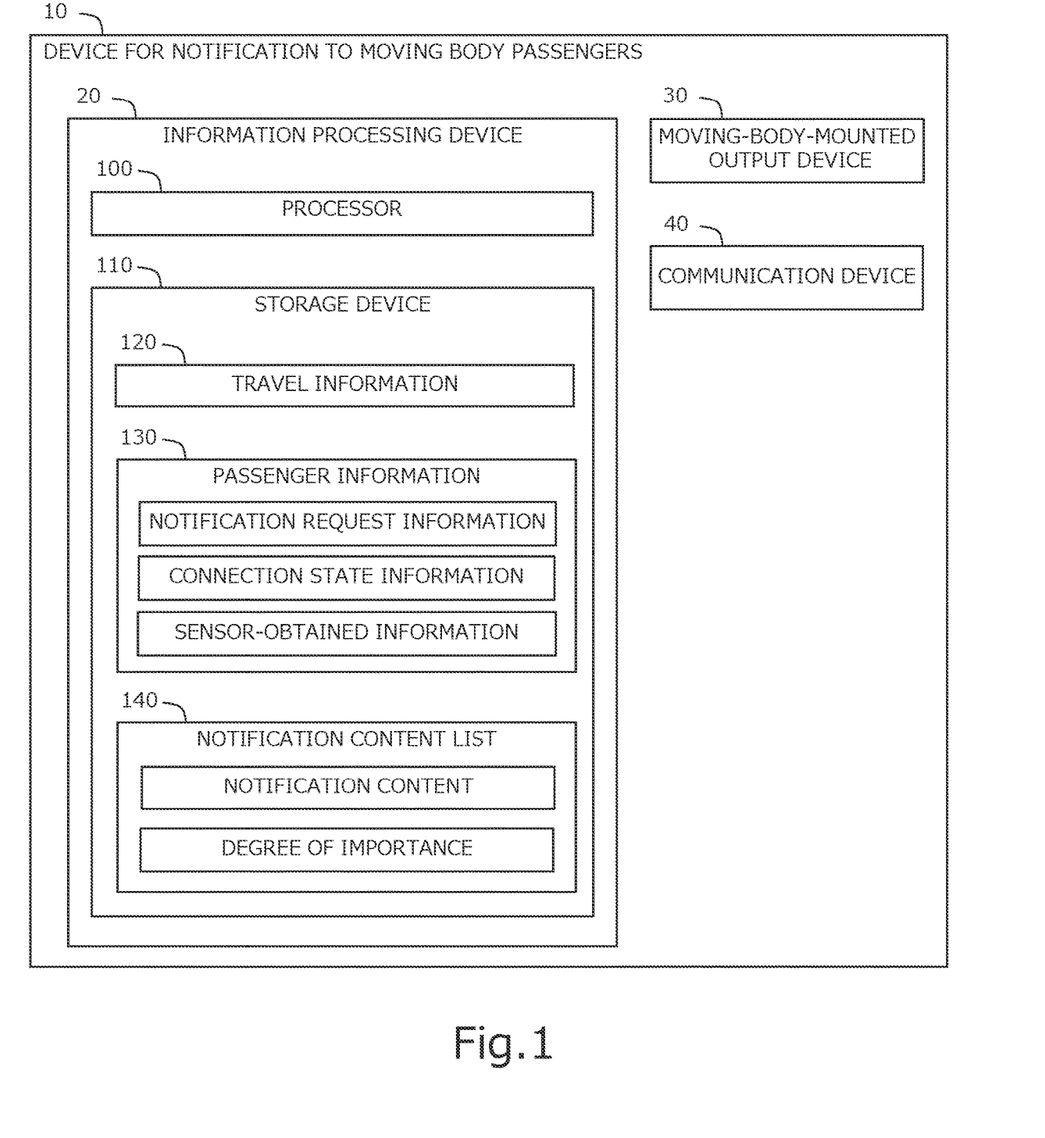
FIG. 1 is a block diagram showing a configuration example of a device for notification to moving body passengers according to a first embodiment of the present disclosure.

A Notification device for moving body passengers according to the present embodiment is a device for, in a moving body that performs automated driving with passengers on board, determining notification contents that the passengers are to be notified of and determine an output destination device of the notification contents at the time traveling of the moving body. The Notification device for moving body passengers according to the present embodiment is mounted on a moving body. FIG. 1 is a block diagram showing a configuration example of a Notification device for moving body passengers 10 according to the present embodiment. The Notification device for moving body passengers 10 includes an information processing device 20, a moving-body-mounted output device 30 and a communication device 40.

The information processing device 20 performs various kinds of information processing. The information processing device 20 includes one or more processors 100 (hereinafter referred to simply as the processor 100) and one or more storage devices 110 (hereinafter referred to simply as the storage device 110). The processor 100 executes various kinds of processes. As the processor 100, for example, an ECU or a CPU are exemplified. The storage device 110 stores data of travel information 120 about the moving body, data of passenger information 130 about passengers and data of a notification content list 140. As the storage device 110, a volatile memory, a non-volatile memory, an HDD or an SSD is exemplified. By the processor 100 executing a program for notification to moving body passengers, which is a computer program, functions of the information processing device 20 are realized. The program for notification to moving body passengers is stored in the storage device 110. The program for notification to moving body passengers may be recorded in a computer-readable recording medium. The program for notification to moving body passengers may be provided via a network.

The travel information 120 includes information about a driving route of the moving body. The travel information 120 also includes information about a target trajectory of the moving body generated based on the driving route. The target trajectory is a trajectory on which the moving body should travel during automated driving, and a travel plan corresponding to the target trajectory is generated on the target trajectory. The target trajectory may be modified based on information obtained from a sensor (camera, radar, LiDAR or the like) mounted on the moving body. The travel information 120 also includes information showing a travel state obtained by sensors (speed sensor, acceleration sensor, steering angle sensor, GPS sensor and the like) mounted on the moving body.

As the travel information 120, estimated time until arrival at a stop (for example, a bus stop) on the driving route is exemplified. The estimated time is calculated, for example, based on the driving route. The travel information 120 also includes information calculated based on the target trajectory and the travel plan. Specifically, estimated time until start of acceleration/deceleration, estimated acceleration/deceleration duration, current acceleration/deceleration, estimated future acceleration/deceleration, estimated time until complete stop, estimated stop duration, estimated time until start of steering, estimated steering duration, current steering speed, estimated future steering speed, current lateral G, estimated future lateral G, estimated lateral G duration, estimated time until start of lane change, estimated time until completion of lane change, estimated lane change operation duration, estimated time until start of avoidance operation and the like are exemplified. The travel information 120 also includes information calculated from topographic information recognized by a camera, an LiDAR and the like. For example, rolling strength and estimated time of occurrence of rolling are information calculated from topographic information.

The passenger information 130 is information about the passengers obtained by a device carried by the passengers, and information about the passengers obtained by sensors (cameras, seating sensors, motion sensors and the like) mounted inside the moving body.

The passenger information 130 includes notification request information, connection state information and sensor-obtained information. The notification request information is setting information about whether notification contents are to be notified or not, on each of the devices carried by the passengers. The connection state information is information about a connection state between each of the devices carried by the passengers and the communication device 40. The sensor-obtained information is information about positions and postures of the passengers obtained from the sensors (cameras, seating sensors, motion sensors and the like) mounted inside the moving body. The passenger information 130 includes information such as attribute information (age, gender, absence/presence of disability and the like) set for the devices carried by the passengers and use information (boarding place, destination, with/without luggage and the like).

As the connection state information included in the passenger information 130, presence/absence of connected passengers' devices (mobile phone, smartphone, tablet PC, notebook PC, wireless phone, smartwatch, wearable display and the like) and identification information about the connected passengers' devices are exemplified.

As the sensor-obtained information included in the passenger information 130, estimated age information, boarding position information and boarding posture information are included. As the boarding position information, area information (front, center, back and the like), seat information (front facing seat, back facing seat, sideways seat, seat on tire and the like) and the like are exemplified. As the boarding posture information, standing, sitting, walking, squatting, holding on to railing, holding on to strap, not holding on to strap, facing forward, facing sideways, facing backward and the like are exemplified.

Each of notification contents set in association with the travel information 120 and the passenger information 130 is configured with content aimed at travel safety, observance of the driving schedule of the moving body, arrival of passengers at destinations on time, and the like. A level of the degree of importance is set according to each configured notification content.

The notification content list 140 is information that includes notification contents set in association with the travel information 120 and the passenger information 130, and degrees of importance of the notification contents.

As the notification contents, notice of arrival at bus stop ("Will arrive at Area A" and the like), notice and warning of acceleration/deceleration ("Will accelerate, please be careful," "Will decelerate, please be careful," and the like), notice and warning steering ("Will turn right, please be careful," and the like), notice of stop ("Will stop," "Will stop about three minutes at the next bus stop," and the like), notice and warning of departure ("Will depart, please be careful," and the like), notice and warning of lane change ("Will change the lane, please be careful," and the like), notice and warning of lateral G ("Vehicle will greatly shake left and right, please be careful," and the like), notice and warning of vertical shake ("Vehicle will shake, please be careful," and the like), explanation of reason for avoidance operation ("Made emergency stop because of sudden stop of the vehicle ahead," and the like), explanation of reason for change of travel route ("Will change the travel route because of traffic jam ahead" and the like), and urging passengers to sit down ("Please sit down for your safety," and the like) and the like are exemplified.

The moving-body-mounted output device 30 is an output device for notifying all the passengers of a notification content. As the moving-body-mounted output device 30, in-vehicle signage, a display, a speaker, lamp or the like is exemplified.

The communication device 40 is a communication interface that performs communication with the devices carried by the passengers to notify the devices of a notification content. The communication device 40 performs a process for assigning data of a notification content to a communication line in order to transmit the data of the notification content to the devices carried by the passengers. As the communication device 40, a DCM (data communication module), a WiFi router or the like is exemplified.

1-2. Detail of Information Processing

The information processing device 20 executes a process for performing control to output a notification content to the moving-body-mounted output device 30 or the communication device 40 or not to output a notification content, based on the travel information 120, the passenger information 130 and the notification content list 140. Information processing according to the present embodiment includes characteristic processes as described below.

Figure 2:
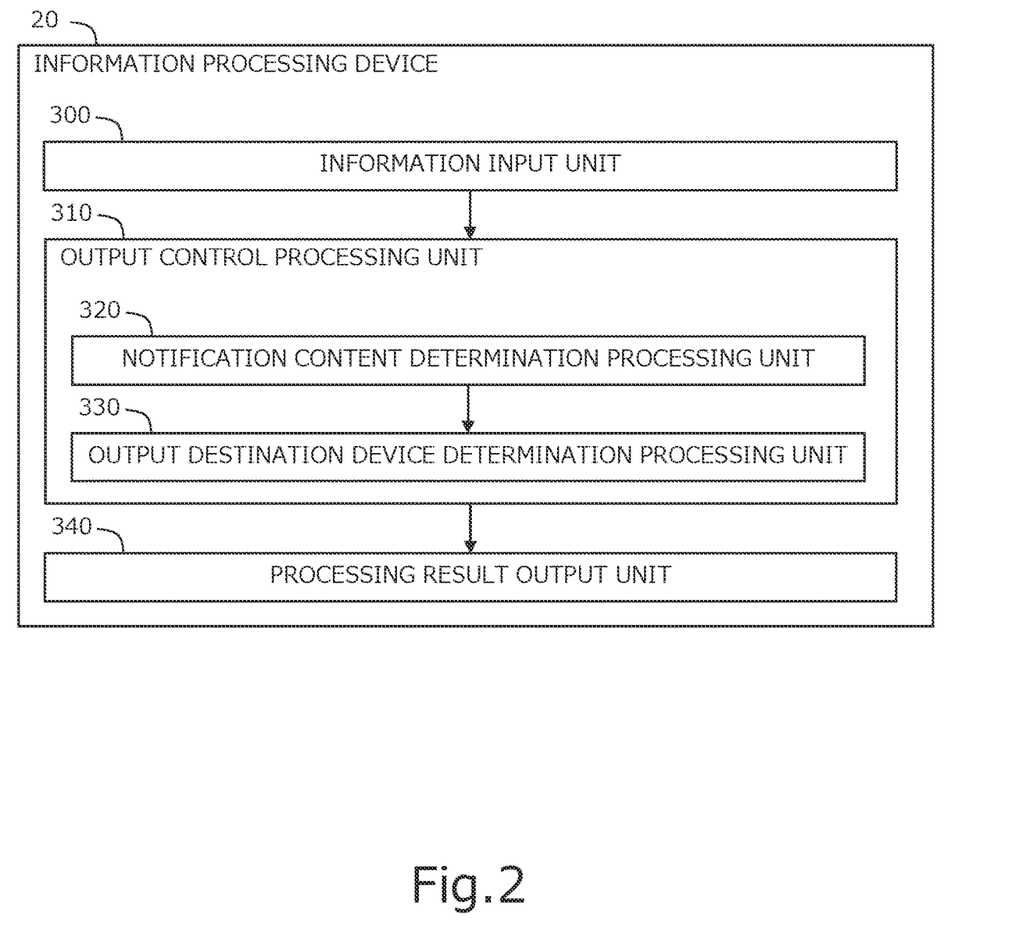
FIG. 2 is a block diagram showing a function example of the device for notification to moving body passengers according to the first embodiment of the present disclosure.

FIG. 2 is a block diagram showing an example of functions related to the information processing according to the present embodiment. The information processing device 20 is provided with an information input unit 300, an output control processing unit 310 and a processing result output unit 340 as functional blocks. These functional blocks are realized by the processor 100 executing the program for notification to moving body passengers.

The information input unit 300 performs a process for inputting the travel information 120, the passenger information 130 and the notification content list 140 recorded in the storage device 110. After that, the inputted travel information 120, passenger information 130 and notification content list 140 are outputted to the output control processing unit 310.

The output control processing unit 310 is further provided with a notification content determination processing unit 320 and an output destination device determination processing unit 330. The output control processing unit 310 makes a determination about a notification content that passengers are to be notified of, based on the inputted travel information 120, passenger information 130 and notification content list 140, and makes a determination about an output destination device to which the determined notification content is to be outputted. Details of each of the notification content determination processing unit 320 and the output destination device determination processing unit 330 will be described later.

The notification content determination processing unit 320 determines whether the inputted travel information 120 and passenger information 130 are included in the notification content list 140 or not. If it is determined that the inputted travel information 120 and passenger information 130 are included in the notification content list 140, a notification content to be targeted by output control (hereinafter referred to as "a control target content") and the degree of importance thereof are identified. The identified control target content and degree of importance thereof are generated as information decided to be notified, which the output destination device is to be notified of Details of the process of the notification content determination processing unit 320 will be described later.

The output destination device determination processing unit 330 determines whether or not the degree of importance of the control target content included in the information decided to be notified, which has been generated by the notification content determination processing unit 320, is at or above a predetermined level, and, according to a result of the determination, determines the output destination device of the control target content. Details of the process of the output destination device determination processing unit 330 will be described later.

Based on a result of the determination about the output destination device of the control target content determined by the output control processing unit 310, the processing result output unit 340 makes a setting for outputting the control target content to the moving-body-mounted output device 30 or the communication device 40.

Figure 3:
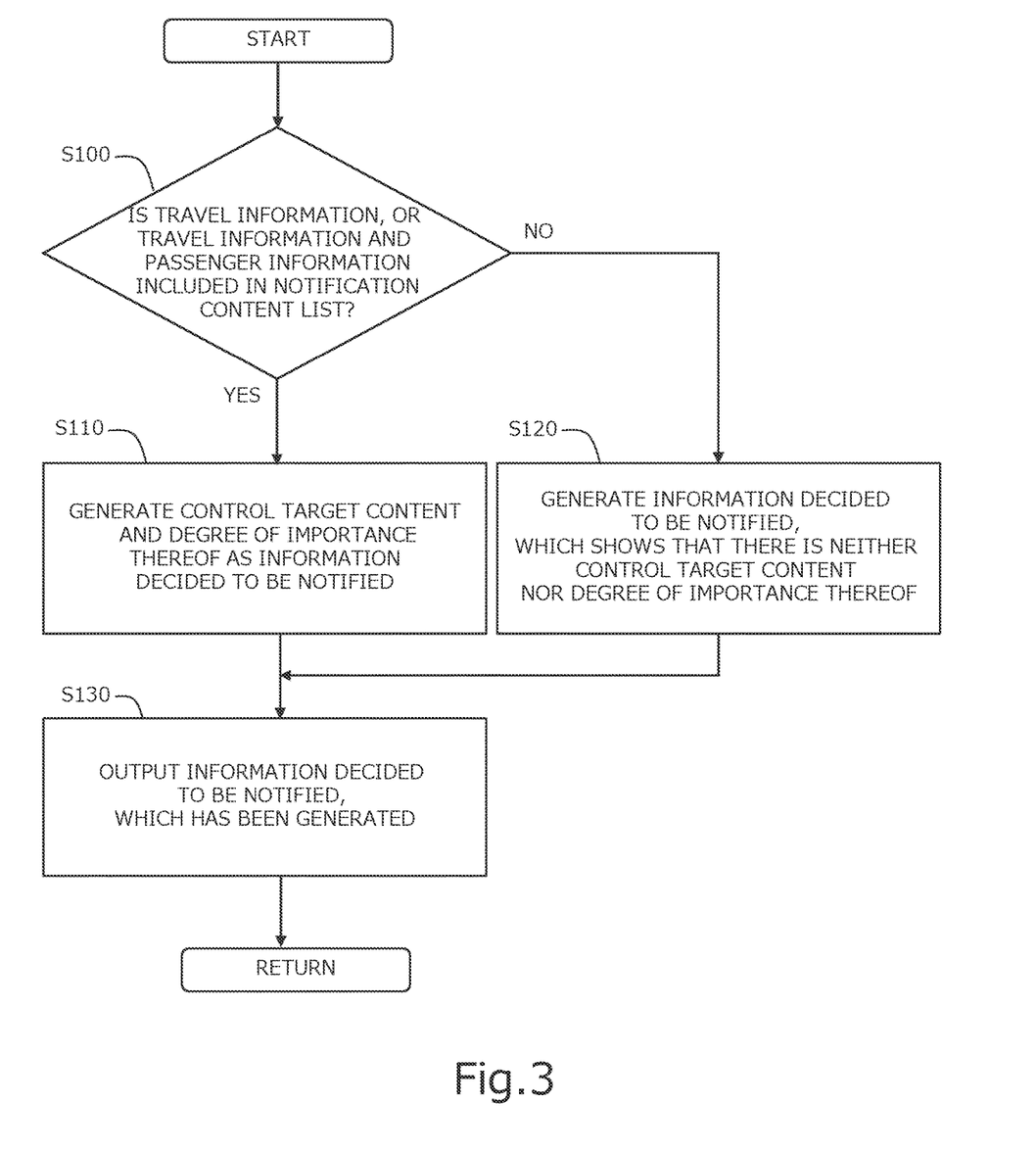
FIG. 3 is a flowchart showing an example of a process of a notification content determination processing unit in an output control processing unit of the device for notification to moving body passengers according to the first embodiment of the present disclosure.

FIG. 3 is a flowchart showing an example of the process of the notification content determination processing unit 320.

At step S100, the notification content determination processing unit 320 determines whether or not the travel information 120, or the travel information 120 and the passenger information 130 are included in the notification content list 140.

If it is determined that the travel information 120, or the travel information 120 and the passenger information 130 are included in the notification content list 140 (step S100; Yes), the process proceeds to step S110. Otherwise (step S100; No), the process proceeds to step S120.

At step S110, the notification content determination processing unit 320 generates a control target content and the degree of importance thereof, as information decided to be notified.

At step S120, the notification content determination processing unit 320 generates information decided to be notified, which shows that there is neither a control target content nor the degree of importance thereof.

At step S130, the notification content determination processing unit 320 outputs the information decided to be notified, which has been generated.

Figure 4:
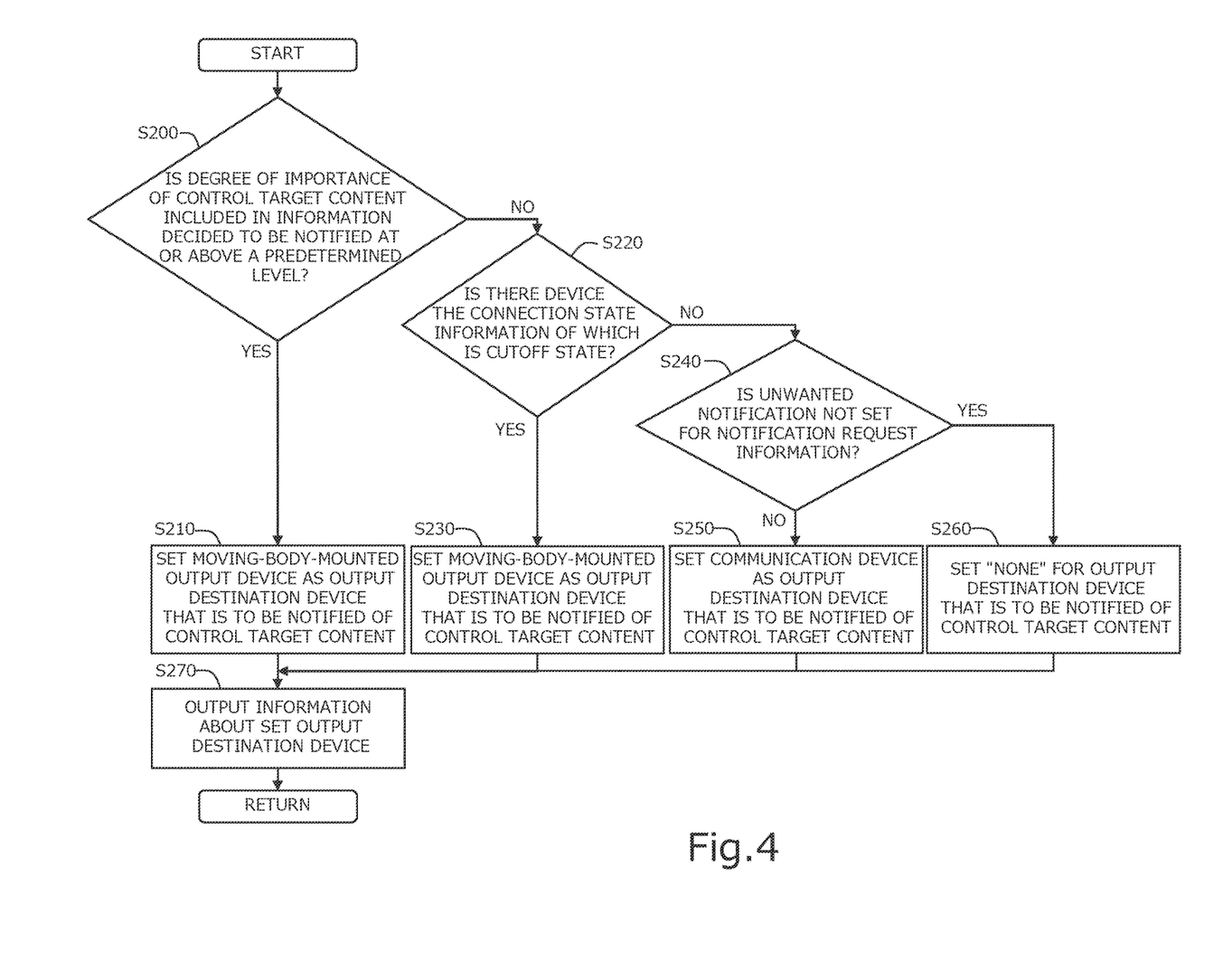
FIG. 4 is a flowchart showing an example of a process of an output destination device determination processing unit in the output control processing unit of the device for notification to moving body passengers according to the first embodiment of the present disclosure.

FIG. 4 is a flowchart showing an example of the process of the output destination device determination processing unit 330.

At step S200, the output destination device determination processing unit 330 determines whether or not the degree of importance of the control target content included in the information decided to be notified, which has been generated by the notification content determination processing unit 320, is at or above the predetermined level.

If it is determined that the degree of importance of the control target content included in the information decided to be notified is at or above the predetermined level (step S200; Yes), the process proceeds to step S210. Otherwise (step S200; No), the process proceeds to step S220.

At step S210, the output destination device determination processing unit 330 sets the moving-body-mounted output device 30 as the output destination device that is to be notified of the control target content.

At step S220, the output destination device determination processing unit 330 determines whether or not there is such a device carried by a passenger that the state of connection with the communication device 40 is a cutoff state in the connection state information included in the passenger information 130.

If it is determined that there is such a device carried by a passenger that the state of connection with the communication device 40 is a cutoff state (step S220; Yes), the process proceeds to step S230. Otherwise (step S220; No), the process proceeds to step S240.

At step S230, the output destination device determination processing unit 330 sets the moving-body-mounted output device 30 as the output destination device that is to be notified of the control target content.

At step S240, the output destination device determination processing unit 330 determines whether or not the notification request information included in the passenger information 130 indicates an unwanted notification.

If it is determined that the unwanted notification is not set (step S240; No), the process proceeds to step S250. Otherwise (step S240; Yes), the process proceeds to step S260.

At step S250, the output destination device determination processing unit 330 sets the communication device 40 as the output destination device that is to be notified of the control target content.

At step S260, the output destination device determination processing unit 330 sets "none" for the output destination device that is to be notified of the control target content.

At step S270, the output destination device determination processing unit 330 outputs information about the set output destination device.

Figure 5:
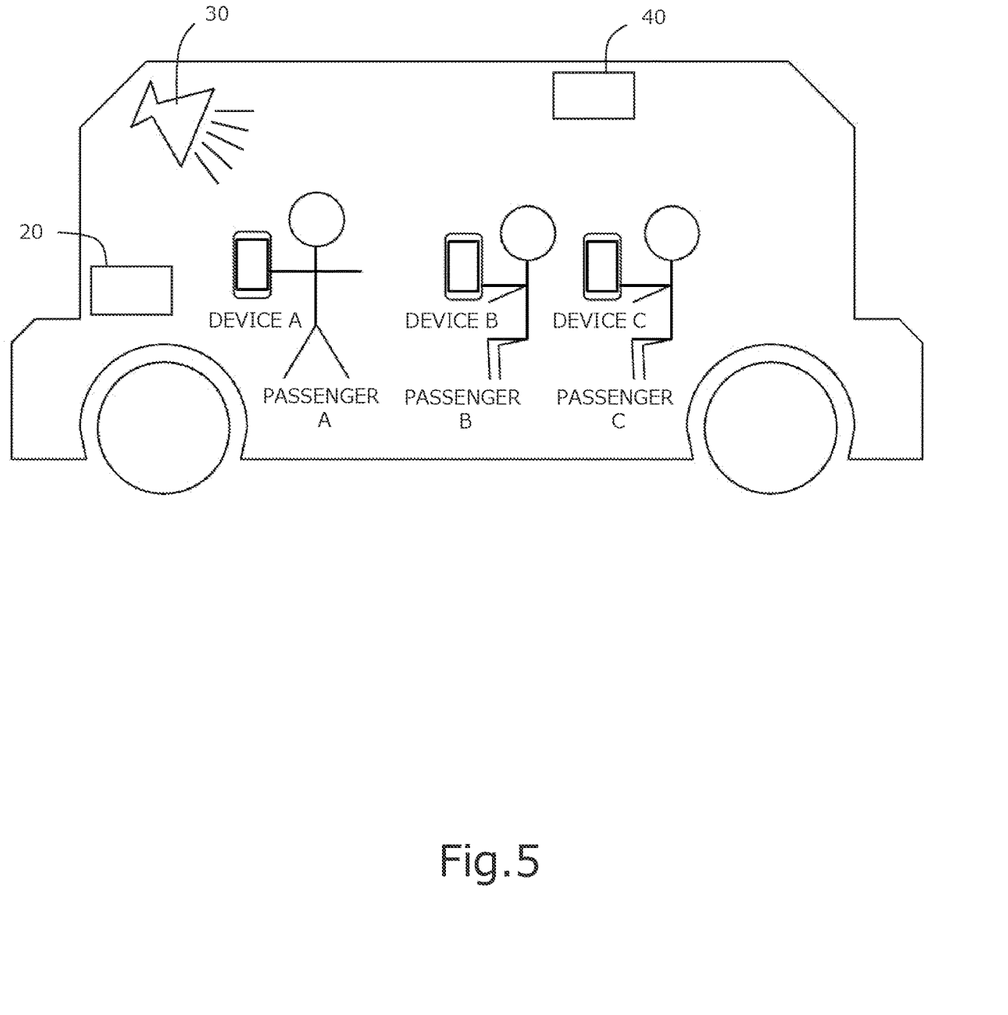
FIG. 5 is a diagram showing a result example in a case where a degree of importance of a notification content at the output control processing unit of the device for notification to moving body passengers according to the first embodiment of the present disclosure is at or above a predetermined level.

FIG. 5 is a diagram showing an example of a result of the output control processing unit 310. Specifically, when it is determined in the information processing device 20 that the degree of importance of a control target content is at or above the predetermined level, the moving-body-mounted output device 30 is set as the output destination device of the control target content, and the passengers are notified of the control target content via the moving-body-mounted output device 30.

Figure 6:
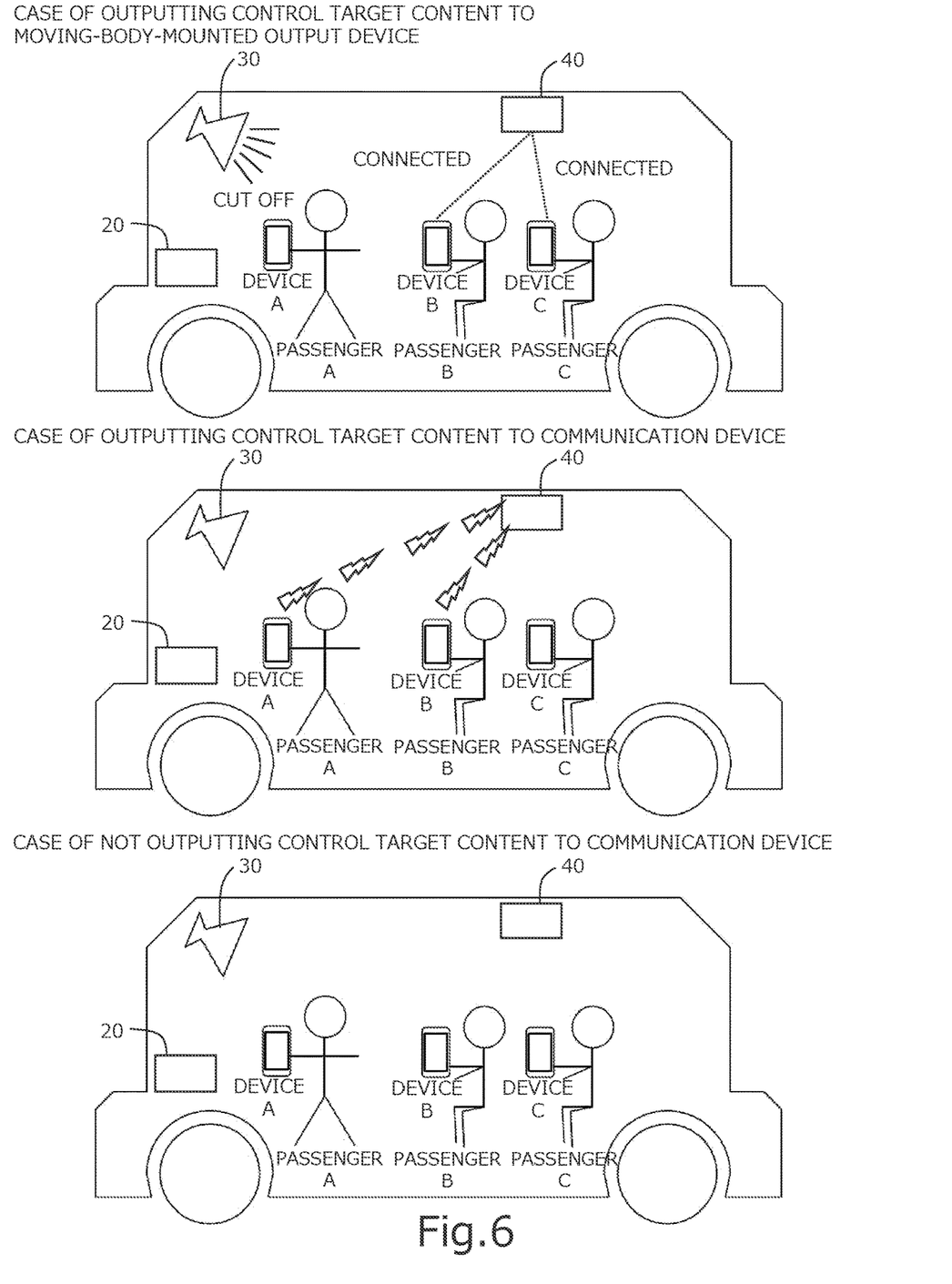
FIG. 6 is a diagram showing a result example in a case where a degree of importance of a notification content at the output control processing unit of the device for notification to moving body passengers according to the first embodiment of the present disclosure is not at or above the predetermined level.

FIG. 6 is a diagram showing examples of a result of the output control processing unit 310. Here, three examples of, when it is determined by the information processing device 20 that the degree of importance of a control target content is not at or above the predetermined level, notifying the control target content based on the passenger information 130 will be given. Specifically, a first example is a case where there is such a device carried by a passenger that the state of connection with the communication device 40 is a cutoff state in the connection state information included in the passenger information 130. In this case, the moving-body-mounted output device 30 is set as the output destination device of the control target content, and the passengers are notified of the control target content via the moving-body-mounted output device 30.

A second example is a case where there is no such a device carried by a passenger that the state of connection with the communication device 40 is a cutoff state, and there are devices for which a setting of being notified of control target contents is made in the notification request information in the passenger information 130. In this case, the communication device 40 is set as the output destination device of the control target content, and the devices for which the setting of being notified is made are notified of the control target content via the communication device 40. On the other hand, for devices for which the unwanted notification of control target contents is set in the notification request information in the passenger information 130, the control target content is not notified.

A third example is a case where, there is no such a device carried by a passenger that the state of connection with the communication device 40 is a cutoff state, and there is no device for which the setting of being notified of control target contents is made in the notification request information in the passenger information 130. In this case, a control target content is set for neither the moving-body-mounted output device 30 nor the communication device 40 as the output destination device, and the passengers are not notified of the control target content.

An example other than the result examples shown in FIG. 6 will be given. Specifically, it is a case where the degree of importance of the control target content of the first example is not at or above the predetermined level, and there is such a device carried by a passenger that the state of connection with the communication device 40 is a cutoff state. In this case, the output destination device of the control target content is the moving-body-mounted output device 30, but it is assumed that, among the passengers, a passenger who has set the unwanted notification is also included. Therefore, when a plurality of moving-body-mounted output devices 30, each of which can make a notification for a predetermined partial range, are installed to make a notification for a whole range, a setting of outputting control target contents may not be made for a moving-body-mounted output device 30 for a predetermined partial range where there are only passengers who have set the unwanted notification.

Furthermore, an example other than the result examples shown in FIG. 6 will be given. Specifically, the same as the second example, it is the case where there is no such a device carried by a passenger that the state of connection with the communication device 40 is a cutoff state, and there are devices for which the setting of being notified of control target contents is made in the notification request information in the passenger information 130. In this case, it is assumed that control target contents that the devices are notified of differ according to the devices. Here, control target contents for each device is set in the communication device 40, and each corresponding device is notified of a set control target contents via the communication device 40. As a method for deciding a control target content for each device, the information about positions and postures of the passengers in the sensor-obtained information in the passenger information 130, and the like may be used.

1-3. Effects

It is possible to, if the degree of importance of a control target content showing notification content targeted by output control is at or above a predetermined level, notify passengers of the control target content via a moving-body-mounted output device irrespective of types of devices carried by the passengers. On the other hand, when the degree of importance of the control target content is not at or above the predetermined level, passengers who do not require notification are not notified of the control target content, and passengers who require notification are notified of the control target content, in an environment where there is no such a device carried by a passenger that the state of connection with a communication device is a cutoff state. Therefore, in this case, it is possible to notify only the passengers who requests notification, of the control target content. Thus, according to the present disclosure, it becomes possible to control output of a notification content to an output destination device according to the degree of importance of the notification content and information about the passengers.

2. Second Embodiment

A second embodiment is different from the first embodiment in the configuration example and the details of information processing. Description overlapping with the description of the first embodiment will be appropriately omitted.

In the second embodiment, attention will be paid to a scene of, in the case where degrees of importance of control target contents are not at or above the predetermined level, notifying, among control target contents that passengers who require notification of control target contents are to be notified of, only control target contents requested by the passengers based on the passenger information. It is though that, among the passengers who require notification, passengers who request only notification of necessary control target contents are included. Therefore, in the second embodiment, control target contents requested by passengers are notified based on the passenger information.

Figure 7:
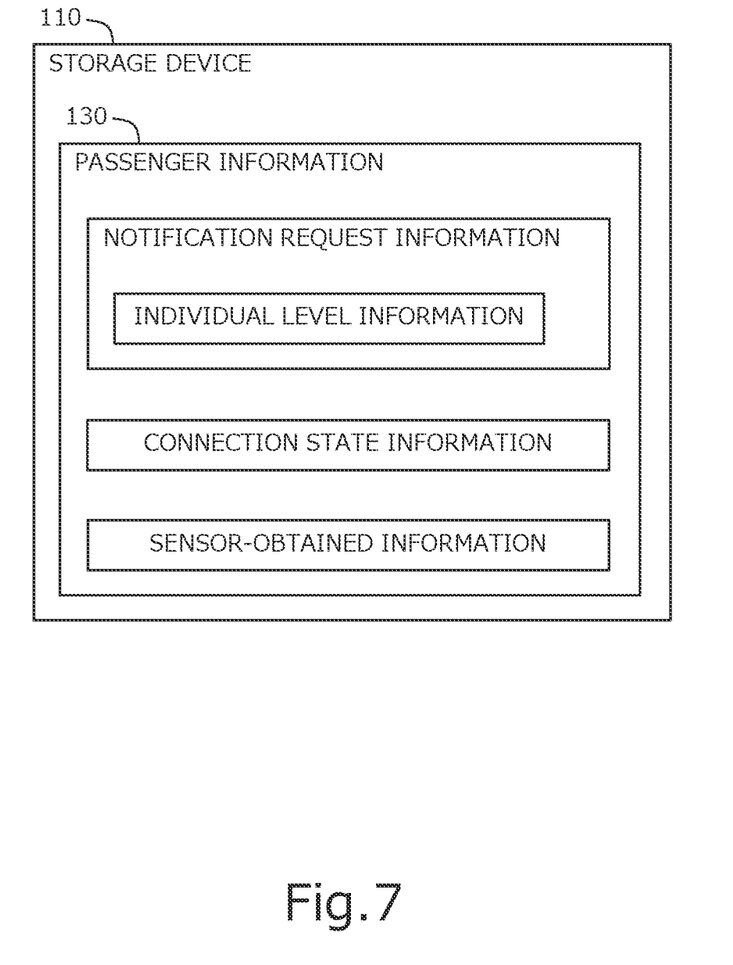
FIG. 7 is a block diagram showing a configuration example of a device for notification to moving body passengers according to a second embodiment of the present disclosure.

FIG. 7 is a block diagram showing details of the passenger information 130 stored in the storage device 110 in a configuration example of a device for notification to moving body passengers according to the second embodiment. The notification request information in the passenger information 130 further includes individual level information. The individual level information is information about individual levels set by the passengers in order to notify, among control target contents that the passengers are to be notified, only control target contents desired by the passenger. The individual levels are individually set for control target contents the degrees of importance of which are below the predetermined level. Setting of the individual levels is performed, for example, by presenting control target contents the degrees of importance of which are below the predetermined level to passengers planning to use a moving body in advance, and each of the passengers responding thereto.

Figure 8:
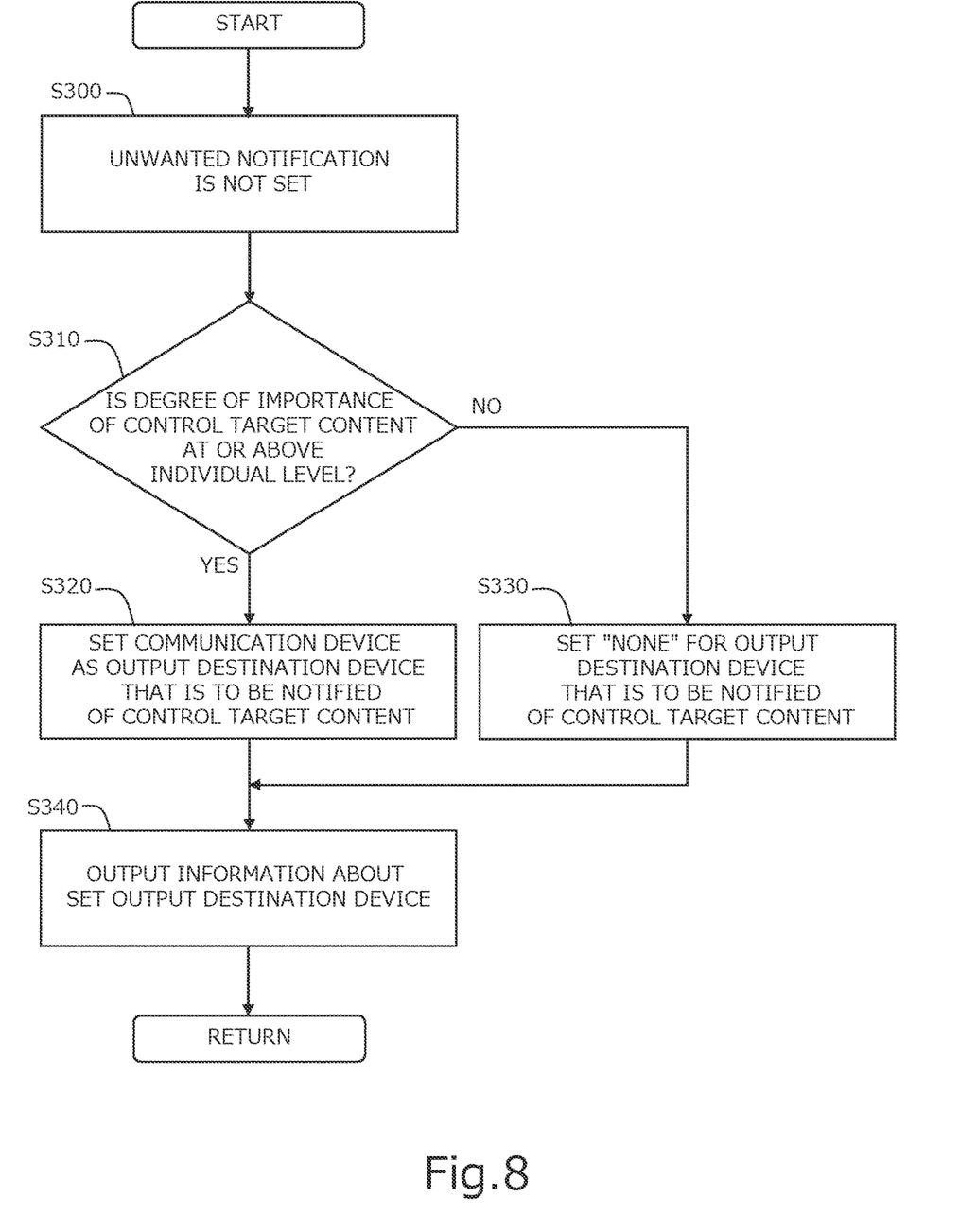
FIG. 8 is a flowchart showing an example of a process of an output destination device determination processing unit in an output control processing unit of the device for notification to moving body passengers according to the second embodiment of the present disclosure.

FIG. 8 is a flowchart showing an example of a process of the output destination device determination processing unit 330 of the device for notification to moving body passengers according to the second embodiment.

At step S300, if the unwanted notification is not set, the process proceeds to step S310.

At step S310, the output destination device determination processing unit 330 determines whether or not the degree of importance of a control target content is at or above an individual level.

If it is determined that the degree of importance of the control target content is at or above the individual level (step S310; Yes), the process proceeds to step S320. Otherwise (step S310; No), the process proceeds to step S330.

At step S320, the output destination device determination processing unit 330 sets the communication device 40 as the output destination device that is to be notified of the control target content.

At step S330, the output destination device determination processing unit 330 sets "none" for the output destination device that is to be notified of the control target content.

At step S340, the output destination device determination processing unit 330 outputs information about the set output destination device.

The individual levels set by the passengers may be controlled according to hours. For example, in a scene of a night bus or the like, notification may not be performed in the night-time if, even though the degree of importance of a control target content is at or above an individual level, the degree of importance of the control target content is below the predetermined level.

As described above, according to the second embodiment, it is possible to notify, among control target contents that each passenger who requires notification of control target contents is to be notified of, a control target content the degree of importance of which is determined to be at or above an individual level set by the passenger, based on individual levels set by passengers. Therefore, in this case, it is possible to notify, among the control target contents that the passenger is to be notified of, only the control target content requested by the passenger. Thus, according to the present disclosure, it becomes possible to control output of notification contents to an output destination device according to degrees of importance of the notification contents and information about passengers.

What is claimed is:

1. A device for notification to a moving body passenger, the device being mounted on a moving body and notifying a passenger on the moving body, comprising:
an information processing device configured to set a notification content to the passenger;
a moving-body-mounted output device configured to output the notification content; and
a communication device configured to transmit the notification content to a device carried by the passenger,
wherein the information processing device comprises:
a storage device configured to store travel information about the moving body, passenger information about the passenger and information about a notification content list including the notification content set in association with the travel information and the passenger information, and a degree of importance of the notification content; and
a processor configured to perform an output control process for controlling output of the notification content to the moving-body-mounted output device and the communication device,
wherein, in the output control process, the processor is configured to:
identify a control target content indicating the notification content to be targeted by the output control, based on the travel information and the information about the notification content list or based on the travel information, the passenger information and the information about the notification content list;
determine whether or not a degree of importance of the control target content is at or above a predetermined level;
output the control target content to the moving-body-mounted output device if based on a determination that the degree of importance of the control target content is at or above the predetermined level, and output the control target content to the moving-body-mounted output device or the communication device or not output the control target content based on a determination that the degree of importance of the control target content is not at or above the predetermined level, wherein the passenger information includes connection state information about a connection state between the device carried by the passenger and the communication device, and wherein, in the output control process, the processor is configured to:
- based on the determination that the degree of importance of the control target content is not at or above the predetermined level, determine whether or not the connection state is a cutoff state, based on the connection state information; and
- output the control target content to the moving-body-mounted output device based on a determination that the connection state is the cutoff state.

2. The device according to claim 1,
wherein the passenger information includes notification request information about the notification content, which is set by the passenger,
wherein, in the output control process, the processor is configured to:
based on the determination that the degree of importance of the control target content is not at or above the predetermined level, determine whether or not an unwanted notification is set for the control target content, based on the notification request information; and
output the control target content to the communication device based on a determination that the unwanted notification is not set.

3. The device according to claim 2,
wherein the notification request information further includes information about an individual level set by the passenger to notify, from a plurality of control target contents, the control target content requested by the passenger,
wherein, in the output control process, the processor is configured to, based on the determination that the unwanted notification is not set:
- determine whether or not a degree of importance of the control target content is at or above an individual level; and
- output the control target content to the communication device based on the determination that the degree of importance of the control target content is at or above the individual level.

4. The device according to claim 1,
wherein the passenger information further includes sensor-obtained information that is information about a position and a posture of the passenger obtained from a sensor included in the moving body.

5. A device for notification to a moving body passenger, the device being mounted on a moving body and notifying a passenger on the moving body, comprising:
an information processing device configured to set a notification content to the passenger;
a moving-body-mounted output device configured to output the notification content; and
a communication device configured to transmit the notification content to a device carried by the passenger,
wherein the information processing device comprises:
a storage device configured to store travel information about the moving body, passenger information about the passenger, information about a notification content list that includes the notification content set in association with the travel information and the passenger information, and a degree of importance of the notification content; and
a processor configured to an output control process for controlling output of the notification content to the moving-body-mounted output device and the communication device,
wherein, in the output control process, the processor is configured to:
identify a control target content indicating the notification content to be targeted by the output control, based on the travel information and the information about the notification content list or based on the travel information, the passenger information and the information about the notification content list;
determine whether or not a degree of importance of the control target content is below a predetermined level; and
output the control target content to the moving-body-mounted output device or the communication device or not output the control target content based on a determination that the degree of importance of the control target content is below the predetermined level,
wherein the passenger information includes connection state information about a connection state between the device carried by the passenger and the communication device, and
wherein, in the output control process, the processor is configured to:
- based on the determination that the degree of importance of the control target content is below the predetermined level, determine whether or not the connection state is a cutoff state, based on the connection state information; and
- output the control target content to the moving-body-mounted output device based on the determination that the connection state is the cutoff state.

6. The device according to claim 5,
wherein the passenger information includes notification request information about the notification content, which is set by the passenger,
wherein, in the output control process, the processor is configured to:
based on the determination that the degree of importance of the control target content is below the predetermined level, determine whether or not an unwanted notification is set for the control target content, based on the notification request information; and
output the control target content to the communication device based on a determination that the unwanted notification is not set.

7. The device according to claim 6,
wherein the notification request information further includes information about an individual level set by the passenger to notify, from a plurality of control target contents, the control target content requested by the passenger, and
wherein, in the output control process, the processor is configured to, based on the determination that the unwanted notification is not set:

determine whether or not a degree of importance of the control target content is at or above an individual level; and output the control target content to the communication device based on the determination that the degree of importance of the control target content is at or above the individual level.

8. A method for notification to a moving body passenger, the method comprising:

setting a notification content to the passenger;

outputting a notification content;

transmitting the notification content to a device carried by the passenger;

obtaining travel information about the moving body, passenger information about the passengers and information about a notification content list including the notification content set in association with the travel information and the passenger information, and a degree of importance of the notification content; and performing an output control process for controlling output of the notification content to the moving-body-mounted output device and the communication device, wherein the output control process comprises:

identifying a control target content indicating the notification content to be targeted by the output control, based on the travel information and the information about the notification content list or based on the travel information, the passenger information and the information about the notification content list;

determining whether or not a degree of importance of the control target content is at or above a predetermined level; and outputting the control target content to the moving-body-mounted output device based on a determination that the degree of importance of the control target content is at or above the predetermined level, wherein the passenger information includes connection state information about a connection state between the device carried by the passenger and the communication device, and wherein the output control process further comprises:

based on the determination that the degree of importance of the control target content is not at or above the predetermined level, determining whether or not the connection state of the device is a cutoff state, based on the connection state information; and outputting the control target content to the moving-body-mounted output device based on a determination that the connection state of the device is the cutoff state.

9. The device according to claim 1, wherein, in the output control process, the processor is configured to output the control target content to the moving-body-mounted output device based on the determination that the connection state is the cutoff state and control the moving-body-mounted output device to notify the passenger of the control target content.

* * * * *